Aug. 11, 1936.   E. W. KELLOGG   2,050,613
CLUTCH OR BRAKE MECHANISM
Filed Dec. 30, 1933
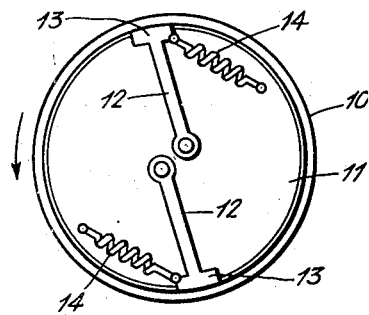
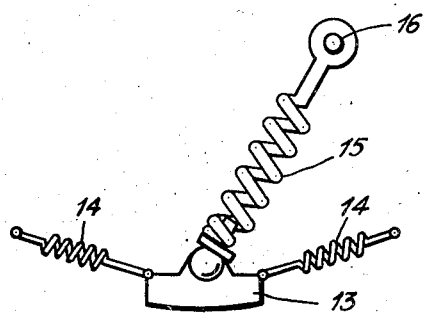
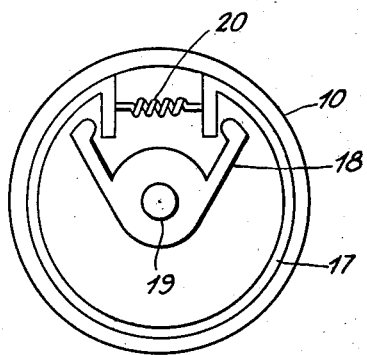
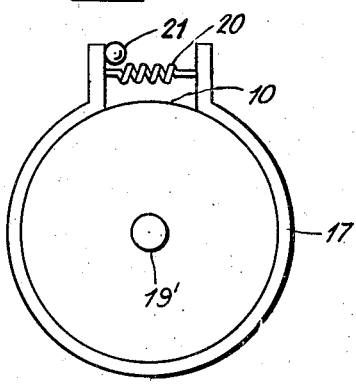
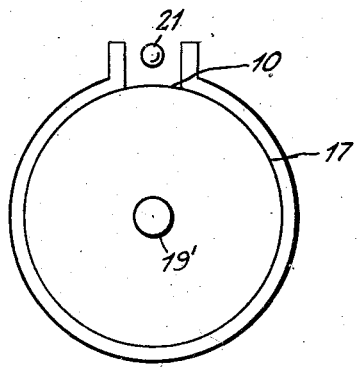
INVENTOR
EDWARD W. KELLOGG
BY
ATTORNEY Patented Aug. 11, 1936

2,050,613

UNITED STATES PATENT OFFICE 2,050,613

CLUTCH OR BRAKE MECHANISM

Edward W. Kellogg, Moorestown, N. J., assignor to Radio Corporation of America, a corporation of Delaware Application December 30, 1933, Serial No. 704,725

2 Claims. (Cl. 64—30)

This invention relates to clutch or brake mechanisms operable to obviate or minimize variations in the torque transmitted from a variable torque source to a load device which it is desired to operate at a more constant speed than is otherwise available.

For many purposes it is desirable that the torque transmitted through a friction clutch should be constant or substantially constant. This condition is usually difficult to obtain for the reason that, if the cooperating surfaces are lubricated, the amount and character of the lubrication changes during operation of the device. Unlubricated surfaces may either acquire a polish or may become cut and roughened. One of the many purposes for which a clutch of uniform driving torque is desired is for the reels of motion picture films and the like. In the case of such reels, a slight drag should be exerted on the supply reel in order that the film may not become too slack. The take-up reel is driven through a slipping clutch. If the clutch is too loose the reel fails to take up the film properly. If the clutch is too tight an excessive pull is exerted on the film and power is wasted and the film may be injured. In accordance with the present invention, this difficulty is minimized or avoided by the provision of an improved device so constructed that the pressure between the cooperating surfaces is automatically adjusted to produce a substantially constant drag irrespective of variations in temperature or of smoothness or condition of surfaces or in the torque supplied to the driving element of the device.

The invention will be better understood from the following description when considered in connection with the accompanying drawing and its scope will be pointed out in the appended claims.

Referring to the drawing,

Fig. 1 illustrates a device which is operable to transmit a substantially constant torque when rotated in a predetermined direction.

Fig. 2 illustrates a somewhat similar device which is capable of operation in either direction, and Figs. 3, 4, and 5 illustrate different embodiments of a drum and resilient band form of torque transmitting device.

The device illustrated by Fig. 1 includes a rotatable drum 10 through which power may be transmitted to a driven member 11 which may be provided with a shaft or other suitable driving element (not shown). The mechanical coupling between the driving and driven members 10 and 11 is effected through a pair of levers 12 pivoted at their inner ends of the member 11, and provided at their outer ends with brake shoes 13 which are pulled into contact with the inner periphery of the drum 10 by means of springs 14. It should be understood that the drum is driven in a counterclockwise direction as indicated by the arrow, and that the springs 14 are of sufficient length or otherwise so constructed that their tension does not materially change in response to the relatively small movement of the brake shoes 13 relative to the driven member 11. Under these conditions, the torque transmitted from the drum 10 through the brake shoes 13 and the member 11 to the load device is substantially constant. The constant friction properties of the device illustrated in Fig. 1 are due to the fact that any change in friction between the drum 10 and brake shoe 13, causes a slight movement of the brake shoe which results in a change in the pressure of the brake shoe against the drum, and this change in pressure compensates for whatever factor may have caused the change in friction. The bar 12, through which the brake pressure which controls friction, is applied to the brake shoe, is so nearly radial in direction that the tangential component of the force transmitted along said bar is very small, and for practical purposes can be neglected in comparison with the other tangential forces acting on the brake shoes, namely friction acting counter-clockwise, and the tangential components of the pulls of springs 14 acting clockwise. Since any unbalance between these two tangential forces is immediately followed by a movement of the brake shoe which results in an increase or decrease in brake shoe pressure with consequent change in the frictional force, it follows that the friction and the tangential component of the pull of spring 14, must always be substantially equal. The amount of friction can be adjusted by altering the tension on the springs 14.

As applied to the film reels or other devices which it may be desired to operate in either direction, the embodiment of the invention shown in Fig. 1 has the objection that it can be operated as a constant friction device only in one direction. In the other direction the brakes will lock and permit no slipping.

This objection is avoided by the use of the device illustrated by Fig. 2 which permits the reel or other load device to be moved in either direction. In this construction the brake shoe lever 12 is made in the form of a relatively stiff spring 15 or other resilient member pivoted at 16 which permits movement of the driving member in either direction past a radial position and is thus adapted to produce a predetermined drag irrespective of the direction of motion.

There are several other forms of brakes which approximate the characteristics of the toggle types illustrated by Figs. 1 and 2. As indicated by Fig. 3, an internal brake shoe 17 tending to expand outwardly and engaged at one or the other of its ends by a drag member 18 mounted on a driven shaft 19 may be utilized to produce a substantially constant torque. This torque may be applied with the drum 10 driven in either direction. The pressure exerted between the brake shoe 17 and the drum 10 may be determined by the inherent stiffness of the brake shoe 17 or by a compression spring 20 inserted between the ends of the brake shoe or by both of these factors.

It is possible to arrange this type of brake or clutch member to be acted on by a driven element such as the pin 21 as illustrated in the modification of Fig. 4. In this case, the brake band 17 is external to the driving drum, and torque is transmitted from the drum through the brake band, to the pin 21 which is mounted on the driven member. Pressure between the end of the brake band and the pin 21 tends to lift the band away from the drum and thereby reduce the friction. Pressure between the member 18 of Fig. 3 and the end of the brake band has a similar effect, and this effect works the same way as the tendency of friction in Fig. 1 to reduce the brake shoe pressure. Owing to the symmetry of the arrangements shown in Figures 3, 4, and 5, they will operate equally well in either direction. It will be apparent that in general, since the arrangements of Figs. 3, 4, and 5 are reversible, either member may be the driver of the other.

The inherent stiffness of the brake band or spring 17 may be relied upon solely without the employment of a separate spring 20, to produce the desired drag between the brake band and the drum 10. This type of arrangement is illustrated by Fig. 5 and will be readily understood without further explanation. The principle of operation however may most advantageously be discussed for the case of a very flexible band or belt held under tension by an adjustable spring 20, for example as illustrated in Fig. 4.

If the brake shoe or band 17 is of the external type as in Fig. 4 and is flexible and maintained in tension by means of a spring 20 its action is similar to a belt and the usual belt formula may be applied. Thus $$T_1 = T_2 \, \epsilon^{-\mu\theta}$$

in which
$T_1$=the tension of the band at its slack end,
$T_2$=the tension of the band at its tight end,
$\mu$=the coefficient of friction,
$\theta$=the angle of contact in radians, and
$\epsilon$=the base of natural logarithms=2.72

The spring 20 exerts a practically constant force between the two ends. If the drum is rotated clockwise while the left hand end is held stationary by the pin 21, the drag of the brake cannot exceed the pull P of the spring, for the pull P is obviously the same as the tight side tension $T_2$. The net drag of the brake is less than $T_2$ by the amount of the slack end tension $T_1$. Since the angle of wrap $\theta$ is large, and materials having moderately high coefficient of friction would be chosen for the design of a clutch or brake thus making $\mu$ also large, the factor $\epsilon^{-\mu\theta}$ will be small in comparison with unity, and therefore $T_1$ is a small fraction of $T_2$. Hence for practical purposes the total brake drag may be taken as substantially equal to $T_2$ or P, its actual value varying between P and a quantity slightly less than P, depending on the coefficient of friction. The variation is very much less than with ordinary brakes in which the drag is directly proportional to the coefficient of friction. This may be illustrated by a simple example:

Assume that a torque of one foot pound is wanted, and the drum radius is 4″, thus requiring a tangential drag of three pounds. Assume also that the brakes are designed on the basis of a normal coefficient of friction of +3 but that this may vary all the way from .1 to .6. The ordinary brake would be given ten pounds pressure, while the constant torque brake of Fig. 4 (taking $\theta$ to be 5.5. radius) would be adjusted by setting the spring 20 for a tension of 3.7 pounds. The resulting torques would then be as follows:

| Ordinary brake 10 lbs. pressure at ⅓ ft. radius | | Constant torque brake, Fig. 4 P adjusted to 3.7 lbs. radius ⅓ ft. $\theta$=5.5. | | | | | |
|---|---|---|---|---|---|---|---|
| $\mu$ | Force 10 $\mu$ lbs. | Torque ft. lbs. | $\mu$ | $T_2$ | $\epsilon^{-\mu\theta}$ | $T_1$ | $T_2-T_1$ | Torque ft. lbs. |
| .1 | 1 | .33 | .1 | 3.7 | .575 | 2.12 | 1.58 | .53 |
| .2 | 2 | .67 | .2 | 3.7 | .33 | 1.22 | 2.48 | .83 |
| .3 | 3 | 1.00 (normal) | .3 | 3.7 | .192 | .70 | 3.00 | 1.00 (normal) |
| .4 | 4 | 1.33 | .4 | 3.7 | .111 | .41 | 3.29 | 1.10 |
| .5 | 5 | 1.66 | .5 | 3.7 | .064 | .24 | 3.46 | 1.15 |
| .6 | 6 | 2.00 | .6 | 3.7 | .036 | .13 | 3.57 | 1.19 |

It will be noticed that while the torque of the ordinary brake varies through a 6:1 ratio, that of the brake of Fig. 4 varies only a little over 2:1 and that for the higher coefficients of friction the variation is quite small. Moreover, ordinary brakes often seize, whereas this is impossible in the case of the brakes shown in this patent.

The belt or band type of constant torque clutch or brake may be very readily constructed to operate equally in two directions. For example, if used as a brake, the stationary pin is placed between the two projections at the ends of the band or brake shoe member and the same effect is obtained regardless of the direction in which the drum is rotated. If the device is used as a clutch, the actuating pin pushes counter-clockwise on the left hand end of the member 17 or clockwise on the right hand end of the member 17. In either case, any tendency to bind is immediately compensated by a lift of the band and a consequent reduction in its pressure on the drum.

Brakes or clutches of the type described herein may be operated either with or without lubricants. For ordinary purposes it is usual to employ just enough lubricant to prevent any tendency toward cutting of one surface by the other. If for any reason it is desired to work the brake or clutch thoroughly lubricated, as for example where extreme smoothness of action is called for, the functioning will be qualitatively the same. Any decrease in pressure normal to the cooperating surfaces will result in a thicker film of lubricant between the two, with consequent decrease in drag or tangential force.

One application for which a lubricated brake of the kind disclosed in my invention is especially useful, is in connection with devices for producing synchronized sound. Many such devices are driven through elastic couplings in order to avoid the transmission of pulsations from the driving system, but the use of the elastic coupling gives rise to oscillations which must be prevented by damping devices. One type of effective damping device is a brake operating through a film of viscous fluid such as oil. An objection to such damping brakes is that with changes of temperature the viscosity of the oil changes and causes changes in the deflection of the elastic coupling which impair the synchronization of the sound. The employment of a brake of the constant drag type results in a definite and calculable deflection of the flexible coupling and hence avoids the above mentioned difficulty. It also makes the damping itself more nearly independent of temperature, and makes the design of the flexible coupling easier and more satisfactory in that the latter does not have to operate with such wide variations of transmitted torque. A perfect constant torque brake would theoretically not act as a damping device for oscillations, but in the present case the thickness of the film of oil cannot change instantly, and the net result is a constant average drag which is desirable, but a drag which is responsive in magnitude to momentary changes of speed, which is the requirement for effective damping.

It is obvious that brakes employing the principles disclosed herein, especially brakes of the class shown in Fig. 1, may be designed to operate, not only on drums or cylindrical surfaces but on any moving surfaces such as a belt or the flat face of a rotating disc. It is further obvious that in the case of the brake operating on a disc, that the automatic adjustment may be accomplished by changing the radius of action of the brake shoe instead of changing the brake shoe pressure.

While the principle of invention has been described as particularly suitable for driving the film reels of motion picture apparatus, it is apparent that its utility is not restricted to such apparatus but is of wide applicability in connection with many different types of brake and clutch apparatus requiring very smooth action, freedom from seizing, and approximately constant transmission or absorption of torque.

In the claims which follow I desire it to be understood that the term "driven member" refers to the member to which torque or force is transmitted through the frictional device, whether the driven member in this sense moves or not. Thus, driven member would mean the stationary member if the device is used simply as a constant torque brake, while it would refer to a moving member if the invention is employed as a constant torque slipping clutch. The principle of operation is the same so long as there is relative motion between the driving and driven members.

It is obvious that the brake element may be attached to the driving member and the surface such as a cooperating drum or disc may be attached to the driven member, or vice versa, without altering in any way the principle of operation or the spirit and purpose of the invention.

I claim:

1. A device for producing substantially constant friction between two relatively movable members including a member having a surface, a brake member engaging said surface, an effectively pivoted compression member making an acute angle with a normal to said surface and engaging said brake member, and elastic means acting on said brake member parallel to said surface in such a direction as to decrease the angle between said compression member and said normal to the surface.

2. A reversible device for producing substantially constant friction including a member having a surface, a plurality of brake members movably engaging said surface, an effectively pivoted elastic compression member making an acute angle with a normal to said surface and engaging said brake member, and adjustable elastic means acting on said brake member parallel to said surface in such a direction as to decrease the angle between said compression member and said normal to the surface.

EDWARD W. KELLOGG.